US012736423B2

(12) United States Patent
Godard

(10) Patent No.: US 12,736,423 B2
(45) Date of Patent: Sep. 15, 2026

(54) METHOD AND DEVICE FOR MONITORING SEVERITY OF VIBRATION IN OVERHEAD POWER LINES

(71) Applicant: Ampacimon S.A., Grace-Hollogne (BE)

(72) Inventor: Bertrand Godard, Seraing (BE)

(73) Assignee: Ampacimon S.A., Grace-Hollogne (BE)

( * ) Notice: Subject to any disclaimer, the term of this patent is extended or adjusted under 35 U.S.C. 154(b) by 410 days.

(21) Appl. No.: 18/552,452

(22) PCT Filed: Feb. 25, 2022

(86) PCT No.: PCT/EP2022/054837

§ 371 (c)(1), (2) Date: Sep. 26, 2023

(87) PCT Pub. No.: WO2022/218597

PCT Pub. Date: Oct. 20, 2022

(65) Prior Publication Data

US 2024/0167909 A1 May 23, 2024

(30) Foreign Application Priority Data

Apr. 12, 2021 (EP) .................................... 21167936

(51) Int. Cl.
*G01L 5/04* (2006.01)
*G01M 5/00* (2006.01)
(Continued)

(52) U.S. Cl.
CPC ............. *G01L 5/04* (2013.01); *G01M 5/0066* (2013.01); *H02G 1/02* (2013.01); *H02G 7/14* (2013.01)

(58) Field of Classification Search
CPC ......... G01L 5/04; G01M 5/0066; H02G 1/02; H02G 7/14
See application file for complete search history.

(56) References Cited

U.S. PATENT DOCUMENTS 5,235,861 A 8/1993 Seppa
5,517,864 A 5/1996 Seppa
(Continued)

FOREIGN PATENT DOCUMENTS

CN 105553101 A * 5/2016 ............. G01D 21/02
EP 3 249 766 A1 11/2017

OTHER PUBLICATIONS

Godard Bertrand: "A vibration-sag-tension-based icing monitoring of overhead lines", Proceedings—Int. Workshop On Atmospheric Icing Of Structures, vol. 1, Jun. 23, 2019, Iceland.
(Continued)

*Primary Examiner* — John C Kuan
(74) *Attorney, Agent, or Firm* — Leydig, Voit & Mayer, Ltd.

(57) ABSTRACT

A method for estimating a severity of vibration, which is a product of vibration frequency f by antinode amplitude of vibration A, and for estimating fatigue lifetime or damage of a suspended electrical cable span of overhead power lines, the suspended electrical cable span having a sag possibly negligible with respect to span length and a local tension, and being subject to a variation of the local tension over time, and to subsequent change of length, due to vibration, the method using an autonomous device with a tension measuring device mounted thereon and fixed to the suspended cable span and an on-board or remotely connected data processing unit, the method including steps of: a. measuring static H and dynamic ΔH local tension components of the suspended span over a time range as a local tension measurement, with the tension measuring device.

6 Claims, 4 Drawing Sheets

(51) Int. Cl.
*H02G 1/02* (2006.01)
*H02G 7/14* (2006.01)

(56) References Cited

U.S. PATENT DOCUMENTS

| | | | | |
|---|---|---|---|---|
| 6,343,515 | B1 | 2/2002 | Dodson | |
| 7,080,689 | B2 | 7/2006 | Guesnon et al. | |
| 7,424,832 | B1 | 9/2008 | Nunnelee | |
| 8,184,015 | B2 | 5/2012 | Lilien et al. | |
| 8,725,429 | B2 | 5/2014 | Mcneill et al. | |
| 2014/0123750 | A1 | 5/2014 | Liu et al. | |
| 2014/0163884 | A1 | 6/2014 | Lilien et al. | |
| 2014/0190268 | A1* | 7/2014 | Hovhanessian | G01M 5/0025 73/812 |

OTHER PUBLICATIONS

Guérard Suzanne et al.: "Evaluation of power line cable fatigue parameters based on measurements on a laboratory cable test span", Jan. 1, 2009, pp. 1-9, ORBi, Belgium.

CIGRE, "Overhead conductor safe design tension with respect to Aeolian vibrations," CIGRE Technical brochure 273, task force B2.11.04, Jun. 2005, France, pp. 1-43.

Guérard Suzanne, "Power Line Conductors, a Contribution to the Analysis of their Dynamic Behaviour," PhD Thesis, University of Liège, Belgium, Jun. 2011, pp. 1-255.

CIGRE, "Fatigue endurance capability of conductor/clamp systems—update of present knowledge," CIGRE Technical brochure 332, Task Force B2.11.07, Oct. 2007, France, pp. 1-58.

CIGRE, "Guide for application of direct real-time monitoring systems", CIGRE Technical brochure No. 498, Study Committee B2, Jun. 2012, France, pp. 1-79.

Deb, Anjan K., "Power line ampacity system: Theory, Modeling, and Applications", CRC Press LLC, US, Dec. 2000, pp. 1-257.

L. Bjerkan et al., Measurements on an Aeolian vibrations on a 3 Km fjord crossing with fiber-optic bragg grating sensors, CIGRE 2004, B2-314, France, pp. 1-8, Dec. 2004.

Leif Bjerkan, "Application of fiber optic Bragg grating sensors, monitoring environmental loads of overhead power transmission lines," Applied Optics vol. 39, No. 4, 554-560, Feb. 2000, Optica, US.

H. Irvine, "Cable Structures," chapter 3 "Dynamics of a Suspected Cable," MIT Press, Cambridge, US, May 13, 1981, pp. 87-135.

* cited by examiner

METHOD AND DEVICE FOR MONITORING SEVERITY OF VIBRATION IN OVERHEAD POWER LINES

CROSS-REFERENCE TO PRIOR APPLICATIONS

This application is a U.S. National Phase application under 35 U.S.C. § 371 of International Application No. PCT/EP2022/054837, filed on Feb. 25, 2022, and claims benefit to European Patent Application No. EP 21167936.0, filed on Apr. 12, 2021. The International Application was published in English on Oct. 20, 2022 as WO/2022/218597 under PCT Article 21(2).

FIELD

The present invention relates to electrical power engineering and distribution and more specifically to a method for estimating, measuring or monitoring severity of vibrations of any type, such as, but not limited to, Aeolian vibration, galloping, buffeting, wake induced oscillations, in a suspended cable span of an overhead electrical power line.

The invention also relates to a device or system for carrying out the above-mentioned method.

BACKGROUND

In-service overhead lines suffer from cumulative fatigue damage caused by wind-induced vibrations, corrosion damage and their coupled effects. Wind vibrations has always been one of the main mechanical problems of the conductors of overhead transmission lines. The main cause of fatigue failure of strands in overhead conductors is Aeolian vibration, a fatigue which generally occurs at points where conductor motion is constrained against transverse vibration, such as suspension. Fatigue may also occur from other wind-induced vibration phenomena and/or events like icing, galloping, wake-induced oscillations, etc. These events are responsible for fatigue conductor strand failures and may shorten the estimated lifespan of the conductor. During Aeolian vibration, or vibration of any other type, the conductor undergoes cyclic movements which induce bending stress in power line conductor wires. These alternate bending stresses will induce fatigue and are at the origin of many conductor problems in the field. Monitoring time history of time-varying cable movement for assessing their fatigue damage is thus essential to diagnose their health condition and predict their future performance as there is significant percentage of overhead lines that are approaching or have reached the end of their design life. The decision-making process for managing these assets requires an accurate, reliable, and real-time condition of the conductor.

The Aeolian vibration control of the conductor is based on the well-known and well documented in literature energy-balance principle that takes into account the wind-energy input, the energy dissipated by the conductor due to hysteretic self-damping properties (or equivalent viscous damping) and, possibly, the energy dissipated by the (Stockbridge) dampers. Vibration amplitude of the conductor is the result of energy balance of (i) forced power from wind, (ii) dampers, if existing, and (iii) self-damping of the conductor. In terms of modelling, the maximum expected amplitude of Aeolian vibration is commonly evaluated, in overhead power lines, by the Energy Balance Principle. Within this approach empirical power laws are used to express energy provided by the wind power input and energy dissipation, and usually require experimental tests to define their coefficients (Conductor self-damping and wind power input are data very difficult to obtain and indeed very strategic to evaluate lifetime based on calculations only). The reliability of the results, hence, is strongly affected by the criteria adopted to define the power input and internal damping, also called self-damping, of the cable. Self-damping depends inter alia on the tension on the conductor, on the wire material (e.g. for a given size and topology, the damping behaviour of an ACSR—for "aluminium conductor steel-reinforced"—conductor will be very different from an aluminium alloy conductor), and on the size of the friction zones (and therefore on the size of the conductor and its amount of layers). Models based on this principle are simple but are not able to consider reality, e.g. an excitation of several frequencies and the variation of wind in time and space. The models based on this principle are also based on some assumptions on turbulence intensity at modelled location (defined by various classes of ground/terrain cover) to define wind power input. The range of such turbulence intensity during light-to-moderate winds associated with Aeolian vibration can be much larger or significantly smaller than the one reported in tables. Research is ongoing also on more sophisticated models (wind variation in space and time, multi-modal excitation as beating pattern exists in Aeolian because more than one vibration mode may be excited at the same time, unified self-damping model, etc.). This energy-balance principle related approach is mainly used at design level to estimate tension conditions (and need of additional damping from additional dampers to be installed on conductor) at installation and during the life of the conductor.

When analysis using the energy balance principle provides the basis, inaccuracies in background data on wind energy and conductor self-damping, along with assumptions and approximations associated with the analytical procedure, introduce potential large uncertainties into estimates of expected stress amplitudes (CIGRE SC22 WG11, 1998). Hence, there is a 2 to 1 factor between the highest and the lowest value of maximum wind power input into conductors according to investigators. Even more consequential, there may be one order of magnitude difference in conductor self-damping estimate at the same tension according to testing methods. Thus uncertainties in the data and assumptions that are required to determine amplitude of vibrations and design maximum safe tensions for Aeolian vibration on the basis of the Energy Balance Principle (that was first/initially concerned only with un-damped, unarmored spans) does made it necessary to consider real-experiment with existing lines/real conditions [CIGRE brochure 273, Overhead conductor safe design tension with respect to Aeolian vibrations, task force B2.11.04, June 2005]. Therefore, a device and method installed on the field for monitoring, validation, and control of design and/or better understanding of the phenomena (from fatigue to wind gust, including any kind of small or large vibrations as buffeting, Aeolian vibrations, galloping, etc.) on real observations is a key tool for asset condition management of overhead lines and for operating the lines in a more known environment. Field experiments with such monitoring sensor provide very useful information on conductor behaviour for both network operation and conductor diagnosis.

Dynamic stresses in a conductor are only partially due to bending. At locations where the motion of the conductor is restrained, mainly at suspension clamps but also at a damper, fitting/marker or spacer clamp, armour rods, etc., the curvatures are maximum, and some micro-slip or even some sliding may occur. Owing to the difficulty to perform accurate measurement of mechanical strain or stress at these points, as the physics of fretting fatigue is extremely complex, and the fatigue phenomenon is also influenced by the clamping system, a mathematical modelling and monitoring of strain/stress of a conductor at constrained location as suspension is extremely difficult to obtain due to strands interactions. As bending stresses in the strands are difficult to measure, some approximation has to be made to computed approximate idealized stresses. Because the conductor fatigue mechanisms are so complex, the stress analysis has to be approximate.

Also, it is difficult to deduce the stress state of a cable from measurement, particularly in inner layers. Therefore, the alternating stress computed at the topmost fibre of a strand is generally chosen as an indicator of the stress state of a cable. The usual vibration intensity indicators are (see next paragraphs):

(i) the product of frequency by the free loop (antinode) single peak ($fY_{max}$);

(ii) β, the angle through which the conductor is bent at the clamp by the vibration;

(iii) the bending amplitude (amplitude of conductor relative to clamp, measured a short distance, generally 89 mm, from the last point of contact between the conductor and the clamp ($Y_b$) or (iv) the dynamic strain in an outer-layer strand in the vicinity of the clamp (ε).

Fatigue curves have been developed through tests on laboratory spans using each of these parameters as a measure of vibration intensity/severity.

The approximate formulae to compute idealized alternating stress in the top surface of a strand/wire at the clamp, and to use for estimating corresponding fatigue indicators, are given by (all based on conductor curvature at the clamp):

(i) As a function of the angle through which the conductor is bent at the clamp by the vibration, β (see FIG. 1)

$$\sigma_a = \frac{dE_a}{2}\beta\sqrt{\frac{H}{EI}}$$

where:

$\sigma_a$ is the stress in outer layer [N/mm$^2$], d is diameter of outer layer strand [m], $E_a$ is the modulus of elasticity of last layer material, generally aluminium (68950 MPa), H is conductor tension [N], EI is the (whole) conductor bending stiffness [Nm$^2$][1],

[1]It is a well-known fact that, during bending, conductors show a variable bending stiffness, but literature would indicate that for problems, which relate to conductor strain in the outer layer, a value approaching Elmin would apply.

β is the conductor angle [decimal degree].

As a function of the antinode amplitude $$\sigma_a = \pi dE_a\sqrt{\frac{m}{EI}}fY_{max}$$

where:

$\sigma_a$ is the stress in outer layer [N/mm$^2$], d is diameter of outer layer strand [m], f is the frequency [Hz], $Y_{max}$ is the 0-pk antinode displacement (half of pk-to-pk amplitude) [m], $E_a$ is the modulus of elasticity of last layer material, generally aluminium (68950 Mpa), m is the conductor mass per unit length [kg/m], EI is the (whole) conductor bending stiffness [Nm$^2$].

As a function of the amplitude in the vicinity of the clamp (Poffenberger-Swart formula)

$$\sigma_a = \frac{dE_a\frac{p^2}{4}}{e^{-px} - 1 + px}Y_b$$

where y is the amplitude at location x [m] ($Y_b$=2y), d is diameter of outside lay strand [m], x is the length of measuring arm (3.5 inches or 89 mm for standardized measurement), $p=\sqrt{EI/H}$ [m], H is conductor tension [N], EI is the (whole) conductor bending stiffness [Nm$^2$].

The so-called bending amplitude Yb is obtained at an industry standard position x equal to 89 [mm] (3.5 [inch]) from the last point of contact with the clamp, Yb being the y peak-to-peak value at this specific x position ($Y_b$=2*y).

The most disseminate approach to evaluate contact stresses, is the practical analytical method, the so-called Poffenberger-Swart formula (P-S), developed for round wire conductors (see above). This method is widely recommended by the Institute of Electrical and Electronic Engineers (IEEE), and adopted by the International Council on the Large Electric Systems (CIGRE) and by the Electrical Power Research Institute (EPRI). In particular, fatigue tests are carried out by measuring two quantities:

(i) either the bending amplitude $Y_b$, which is the peak-to-peak conductor's vertical amplitude of vibration measured at standardized distance 89 [mm] (or 3.5 [inch]) from the last point of contact with the clamp, (ii) or (and possibly simultaneously with the former one) the maximum antinode amplitude max of vibration (more exactly the product frequency times the vibration antinode amplitude $Y_{max}$ and $Y_{max}$ is the 0-to-peak antinode amplitude, i.e. half the peak-to-peak amplitude). Endurance limits are defined in the literature by at least one of these two basic data ($Y_b$ or product frequency f times antinode amplitude $Y_{max}$). Many discussions exist on that subject and the literature converts these two quantities into bending strain or stress in the outer layer of the conductor's aluminium wire by mathematical models as given in previous section.

The Institute of Electrical and Electronic Engineers (IEEE) implemented a standardization of conductor vibration measurements. As mentioned above, it is based on the differential vertical peak-to-peak displacement ($Y_b$) of the conductor as related to a suspension clamp, measured 89 mm (3.5 inches) from the last point of contact between the clamp and the conductor. Later on, Poffenberger and Swart formulated the dynamic deflection field of the conductor in the vicinity of a fixed clamp and provided relations to convert the bending amplitude into a dynamic curvature and bending stress in the outer strand layer. The calculation of conductor life expectancy before first strand fatigue failure from bending amplitudes has been proposed by CIGRE Working Group 22.04 (1979). Bending amplitude $Y_b$ is the most practical/existing field measurement for the time being (see existing sensors as Vibrec, Pavica, etc.) and gaps to be filled with respect to wind-induced fatigue of overhead lines are known and notably related to in situ measurements (in-span instruments to measure antinode amplitudes as present recorders measure curvature parameter at the suspension clamp), instruments to detect strand failure, etc. Because of energy savings, these existing devices only typically perform a few (or a few tens) seconds of vibration measurements every 10 to 15 minutes. Lots of information may then be lost on the real "load history" (history of amplitude and frequency occurrences). The recordings may thus not represent the full real conditions.

From past and recent literature related to fatigue of overhead conductors [*CIGRE brochure* 332, *Task Force B*2.11.07, *Fatigue endurance capability of conductor/clamp systems—update of present knowledge*, October 2007], cumulative damage theory is used for the estimation of residual life in fatigue. The damage cumulative approach has been recommended by CIGRÉ (1979, 1988) for applying the Stress-Cycles (S-N) curves as an endurance limit. This approach is based on Miner's theory (Miner, 1945) and on the accumulation damage method. Miner's rule, which is one of the simplest cumulated damage laws, was proposed to be based on the following key assumptions: (i) the rate of damage accumulation remains constant over each loading cycle—it is not sensitive to the load sequence by the linear accumulation theorem of fatigue damage and the influence of load sequence on fatigue life is ignored; (ii) the damage occurs and accumulates only when the stress is higher than the fatigue limit. Experimental results have shown that the damage of loads (including low amplitude loads nearby the fatigue limit) is one of the main reasons for prediction errors. However, the cycles having amplitude below the fatigue limit can actually contribute to an increase of existing fatigue damage. The significance of the damage contribution of such small cycles depends on the type of load spectrum; (iii) the failure of component is assumed to occur when cumulative damage reaches the unity. Improvements to this damage law have been proposed but somewhat improper Miner's rule remains the most widely used because of its simplicity. Miner's rule considers that a material will fail in fatigue when the accumulated damage from all stress cycles reaches a certain value. The amount of damage each cycle causes depends on the amplitude of its stress. Under Miner's rule, the amount of damage a cycle of stress a causes is equal to $1/N_i$, where $N_i$ is fatigue life when a is the sole fatigue-inducing stress. The rule states that the total damage under exposure to m different stress amplitudes is $$D = \sum_{i=1}^{m} \frac{n_i}{N_i}$$

where $n_i$ is the number of cycles at $\sigma_i$ in the exposure.

Failure is expected to occur when the damage parameter D exceeds 1. CIGRE proposes the Stress-Cycles (S-N) graph called 'Safe Border Line' (SBL) obtained from a compilation of multiple fatigue test results on conductors in several laboratories globally. The fatigue characteristics of the conductor/clamp system where fatigue may be expected, that is, some form of the function $N(\sigma)$ or $\sigma(N)$ representing the fatigue (or Wöhler) curve, is obtained from a compilation of multiple fatigue test results on conductors in several laboratories globally. Data on the exposure of that system to fatigue-inducing stresses in the field, that is, the distribution $\sigma_i(n_i)$ of the accumulated cycles at each of the stress levels experienced in the field, are usually expressed as cycles, or megacycles, per year. Conserving the remarkable scattering in the conductor fatigue characteristics, estimation of conductor lifetime is an extremely challenging task. A too simple conductor life expectancy as computed as such is considered to have only qualitative significance. Therefore, the real-time estimate of severity of amplitude of vibration through a device and a method from the fields is of prime importance.

According to Guerard S., *Power Line Conductors, a Contribution to the Analysis of their Dynamic Behaviour*, PhD Thesis, University of Liège (2011), some problems arise when applying such fatigue curves in order to assess vibration of field spans. For example, talking about $fY_{max}$, $\beta$ (see above), $\varepsilon$ (dynamic strain in an outer-layer strand in the vicinity of the clamp), "the parameter expressing vibration intensity may be inconvenient to measure reliably in the field" and, talking about $fY_{max}$, "it does not do justice to the complicated behaviour found there". It is true that $fY_{max}$ does not reflect the interstrand fretting fatigue mechanism at the clamp, but actually, which information is needed? An engineer in charge of the maintenance of transmission assets probably wants to know whether a line is at risk or not and whether remedial actions are needed. In this case, $fY_{max}$ is an image of the fatigue risk on a span. If antinode amplitudes are small, then the amplitudes in the vicinity of a clamped device will generally be small. The opposite is not true: the amplitude measured at a suspension span, where an armour rod may be installed, often behind a vibration damper will not necessarily reflect in-span amplitudes. Also, clamped devices will often be installed in-span such as a spacer for example. Therefore, an analysis solely based on the measurement of $Y_b$ at the span ends may fail to detect some vibration risks: $Y_b$ must therefore be measured at any location where the conductor motion is restrained. A second example is that "vibration fatigue tests data are only available for a small fraction of the conductor sizes and types that are in use, and such data are expensive to acquire. Since none of the above parameters is simply related to the fatigue-initiating stresses, results from tests on one specific conductor size are not necessarily applicable to others". A similar example is that "fatigue tests have to be performed with a particular clamp" and it has been found that different types of clamps may yield to quite different fatigue test results. An additional example arises when field vibration amplitude is not a constant, "while available fatigue tests are performed keeping the selected amplitude parameter constant". Therefore, a real-time monitoring device- and method-installed on the conductor of overhead lines, able to estimate severity of vibrations through for example fatigue indicators $fY_{max}$ and/or through frequency analysis and antinode estimation, is of prime importance and interest for utilities and vibration-based asset management of the overhead lines.

Currently, on-line monitoring is widely applied to monitor power lines. As explained in U.S. Pat. No. 8,184,015 B2, continuous monitoring of electrical power lines, in particular high-voltage overhead lines, is essential to timely detect anomalous conditions which could lead to a power outage. Smart sensors are increasingly equipping power lines. One of their actual main applications is linked with dynamic line rating ("Guide for application of direct real-time monitoring systems", CIGRE Technical brochure No. 498, Study Committee B2, 2012). Dynamic Line Rating (DLR or real time thermal rating RTTR) is nowadays a must for many utilities (A. Deb, "Power line ampacity system", CRC Press, 2000, 251 pages). However, in the past, decisions on the management of overhead transmission lines were frequently based on the qualitative judgment and not directly related to monitoring/measurement devices installed on the fields.

Unfortunately, this concern has not been included yet in analysis/measurement directly related to the above-mentioned DLR applications.

Moreover, given the importance of power line monitoring, several devices and systems have been proposed to measure at least some of the relevant parameters related to fatigue indicators. For example, it is known to install displacement measurement systems (such as Pavica, Vibrec, etc.) at a given short distance (e.g. 89 mm) from a cable suspension point in order to measure high-frequency vibrations, but this is only a partial solution to the monitoring problem and, in particular when fittings like dampers, warning spheres, armour rods, etc., are installed along the span (the bending amplitude at suspension is not only the one to be considered as highlighted in previous section). These devices are not installed on dead-end spans.

This is only a partial solution to the monitoring problem and such systems are solely oriented to evaluate the life time of power line conductor due to the bending fatigue induced by Aeolian vibrations cycles on conductor strands near clamps.

As a second example, fibre optic sensor technologies are finding growing application in the area of monitoring civil structures The most attractive fibre optic sensor is the Fibre Bragg Grating (FBG) which is sensitive to strain in any form, that is from bending, stretching or temperature change. It is detailed in L. BJERKAN et al, *Measurements on an Aeolian vibrations on a* 3 *Km fjord crossing with fiber-optic Bragg grating sensors*, CIGRE 2004, B2-314 and Leif Bjerkan, *Application offiber optic Bragg grating sensors, monitoring environmental loads of overhead power transmission lines*, Applied Optics Vol. 39, No. 4, 554-560, February 2000, that, such as FBG measurement, is able to estimate vibration of overhead lines. The existing drawback of this method is that most of the time fibre optic is not available in existing overhead conductor and its installation is difficult, the fibre optic cable must be fixed to one strand of the conductor or wrapped along the whole span with specific machine and it should be addressed with caution in case of existing fittings on the line. The instrumentation must be directly connected to a computer, at the end of the section for example, for data acquisition and analysis.

In another example, sag of power lines monitoring can be performed by measuring vibrations of the conductor as detailed in U.S. Pat. No. 8,184,015 B2. As detailed in the above-mentioned patent, sag is solely determined by the fundamental frequency estimation of the vibrations of the conductor. Previously sag monitoring system was directly related to dynamic line rating of power lines and this has no direct relationship with vibrations severity measurement and/or estimating free-antinode amplitude from local vibrations measurement. A drawback of this method in estimating the free antinode amplitude and severity of vibration is that the conversion of local vibrations measurement to free antinode amplitude needs a known mode shape for each excited frequency. Sometimes it is very difficult to get mode shape, especially when dampers are considered as their frequency impedance depends on velocity at dampers location, not known from the fields as no measurement is available, and/or impedance curves are not known or partially known at specific velocity value. In addition results from predetermined models are prone to error for complex vibration phenomena such as vortex-induced vibration, as needed parameters are unknown and/or inaccurate. Therefore, such a method is prohibitive and likely to be inaccurate when applied to real installation. Therefore, a device directly installed on the line monitoring directly giving antinode amplitude with no need to know mode shape would be helpful.

In another example, US 2014/0163884 A1, a determination of parameters related to the speed of wind that blows near an overhead electrical power line (with single or bundle conductors) is disclosed. The wind speed value is estimated through vibrations measurement of the conductor. Previously monitoring system was directly related to dynamic line rating of power lines and this had no direct relationship with vibrations severity measurement and/or estimating free antinode amplitude from local vibrations measurements.

In another example, U.S. Pat. Nos. 5,235,861 A, 5,517,864 A detail a power line monitoring using tension sensor measurement located at a line pole. A drawback of this method is that the conductor must be disconnected from the pole when the measurement device is installed at the pole. U.S. Pat. No. 6,343,515 B1 details a method and apparatus to perform a measure of tension in any location along a wire. Other older patents, as for example U.S. Pat. No. 7,424,832 B1, use the same philosophy to measure the tension in a wire. Patent application EP 3 249 766 A1 presents a local tension measurement combined to sag measurement to estimate atmospheric accretion on suspended cable of a power lines.

The devices and methods of previously cited patents are related to power line monitoring but this has no direct relationship with vibrations severity measurement and/or estimating free-antinode amplitude from local vibrations measurements.

U.S. Pat. No. 8,725,429 B2 is directly related to fatigue monitoring of a cable. The drawback of this method is that the measurement of bending force for an overhead line is very difficult as the measurement device must face electrical constraint due to voltage during operation. This is not considered in the above-mentioned patent and this has no direct relationship with estimating free-antinode amplitude from local vibrations measurements. Thus this method is not directly usable in the field of power lines since no attention is paid to high voltage constraints, as for example a need for electromagnetic shielding of the monitoring electronics, for anti-corona design, etc. In the above-mentioned patent it is also noted that some existing patent (U.S. Pat. No. 7,080,689 B2) discloses a complex system, not directly related to overhead lines, that relies on the presence of multiple sensors along the length of a drilling riser and unfortunately requires many additional sources of data, such as environmental data. A direct device and method estimating fatigue indicators may fix these drawbacks.

In B. GODARD, *A vibration-sag-tension based icing monitoring of overhead lines*, Proceedings—Int. Workshop on Atmospheric Icing of Structures, vol. 1, 23 June 2019, pages 1-7, is presented a patented vibration-sag-tension based sensor and a method for real-time measuring/detecting atmospheric accretion of all possible types (ice, snow, wet snow, frost, etc. and any of their mixtures as for example rime icing) on overhead lines. Local tension of the conductor is measured through an imposed infinitesimal deflection applied to conductor through a tension/strain gauge sensor.

Aeolian vibrations of overhead lines have been known for years. Left uncontrolled, these vibrations, which are excited by the oscillatory forces caused by Kalman vortices, lead to fatigue damage of the conductors. Hence there is a need for a suitable system for real-time and on-site monitoring the severity of vibrations and a need for suitable updated calculation for predicting the vibrations level thanks to adequate fields measurements.

SUMMARY

In an embodiment, the present invention provides a method for estimating a severity of vibration, which is a product of vibration frequency f by antinode amplitude of vibration A, and for estimating fatigue lifetime or damage of a suspended electrical cable span of overhead power lines, the suspended electrical cable span having a sag possibly negligible with respect to span length and a local tension, and being subject to a variation of the local tension over time, and to subsequent change of length, due to vibration, the method using an autonomous device with a tension measuring device mounted thereon and fixed to the suspended cable span and an on-board or remotely connected data processing unit, the method comprising steps of: a. measuring static H and dynamic ΔH local tension components of the suspended span over a time range as a local tension measurement, with the tension measuring device, so as to obtain a time-dependent tension measurement signal, the antinode amplitude of vibration being related to the local tension measurement; and b. performing a frequency or time-frequency analysis of the time-dependent tension measurement signal, with the data processing unit, wherein an estimation of the severity of vibration is obtained from the local tension components of the formula:

$$\frac{1}{\pi}\sqrt{\frac{\Delta HH}{ESm}} = Af$$

wherein m, E, and S are, respectively, a mass per unit length, a modulus of elasticity, and a section of the suspended electrical cable span, and wherein the fatigue lifetime or damage are obtained from a number of cycles estimated from the frequency or time-frequency analysis and a stress level is obtained from the tension.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
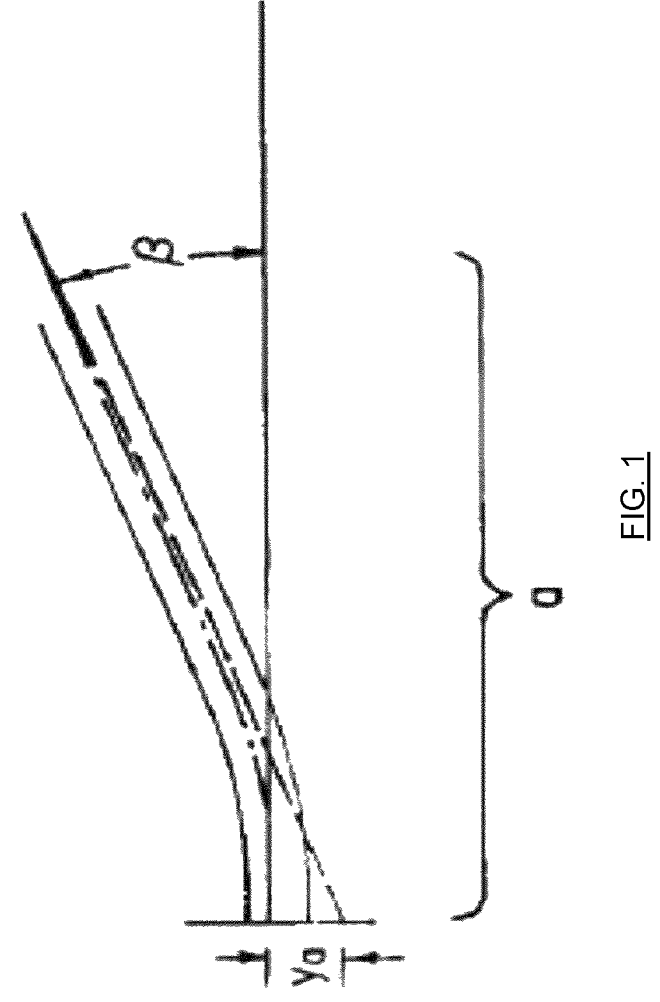
FIG. 1 is representing the angle through which the conductor is bent at a clamp by vibration (in *Transmission Line Reference Book: wind induced conductor motion*, Electric Power Research Institute, Palo Alto, California, United States, 2006). $y_a$ is the curve of the conductor [m] and β is the angle through which the conductor is bent at the clamp by the vibration (EPRI).

In an embodiment, the present invention provides on-line direct local measure/monitoring of vibration severity in overhead power lines in a number of applications.

In an embodiment, the present invention provides a method for monitoring the transmission and distribution network since wind-induced mechanical-dynamical phenomena experienced on overhead lines can lead to mechanical damages of the conductors as a result of material fatigue, mechanical damages of the insulators, armatures and towers and therefore power outages and/or failure.

A first aspect of the present invention relates to a method for estimating the severity of vibration, which is the product of vibration frequency f by antinode amplitude of vibration A, and for estimating fatigue lifetime or damage of a suspended electrical cable span of overhead power lines, said suspended electrical cable span having a sag possibly negligible with respect to span length and a local tension, and being subject to a variation of said local tension over time, and to subsequent change of length, due to vibration, said method using an autonomous device with a tension measuring device mounted thereon and fixed to the suspended cable span and an on-board or remotely connected data processing unit, said method comprising the steps of:

a. measuring static H and dynamic ΔH local tension components of the suspended span over a time range, with the tension measuring device, so as to obtain a time-dependent tension measurement signal, said antinode amplitude of vibration being related to the local tension measurement;

b. performing a frequency or time-frequency analysis of said time-dependent tension measurement signal, with the data processing unit;

wherein said estimation of the severity of vibration is obtained from said local tension components according to the formula:

$$\frac{1}{\pi}\sqrt{\frac{\Delta HH}{ESm}} = Af$$

where m, E and S are respectively the mass per unit length, the modulus of elasticity and the section of the suspended electrical cable span;

and wherein said fatigue lifetime or damage are obtained from a number of cycles estimated from said tension frequency analysis and a stress level is obtained from said tension.

According to preferred embodiments, the method is further limited by at least one of the following characteristics or by a suitable combination thereof:

said tension measuring device is operating within a pass-band extending between 0 Hz and 300 Hz;

the severity of vibration, defined as the product of said antinode amplitude by said frequency, is obtained from said tension measurement of said suspended span and said frequency analysis of said tension measurement;

stress in the cable span is estimated by a linear function of measured severity of vibration;

said fatigue lifetime or damage during an event or extreme event, inducing change of cable span length, and selected from the group constituted of galloping, creeping, ice-shedding, storms and maintenance work, is obtained Another aspect of the invention relates to a non-transitory computer-readable medium with instructions stored thereon, that when executed by a computer processor, performs the steps of the aforementioned method, when the computer processor is on-board in the autonomous device or remotely connected to the autonomous device comprising the tension measuring device for measuring the local tension of the suspended span over a time range.

Still another aspect of the invention relates to a system for estimating the severity of vibration, which is the product of vibration frequency f by antinode amplitude of vibration A and for estimating fatigue lifetime or damage of a suspended electrical cable span of overhead power lines, said system comprising:

an autonomous device fixed on said suspended cable span, and comprising a tension measuring device mounted thereon; and an on-board data processing unit or a data processing unit remotely connected to the autonomous device;

and configured to implement the steps of:

measuring static H and dynamic H local tension components of the suspended span over a time range, with the tension measuring device, so as to obtain a time-dependent tension measurement signal, said antinode amplitude of vibration being related the local tension measurement;

performing a frequency or time-frequency analysis of said time-dependent tension measurement signal, with the data processing unit;

wherein said estimation of severity of vibration is obtained from said local tension components according to the formula:

$$\frac{1}{\pi}\sqrt{\frac{\Delta HH}{ESm}} = Af$$

where m, E and S are respectively the mass per unit length, the modulus of elasticity and the section of the suspended electrical cable span;

and wherein said estimation of fatigue lifetime or damage is obtained from a number of cycles estimated from said tension frequency analysis and a stress level is obtained from said tension.

Advantageously, the local tension measuring device imposes a deflection to a cable portion of the overhead power lines traversing the autonomous device, providing resulting output strain gauge measurements.

While the invention is amenable to various modifications and alternative forms, specifics thereof have been shown by way of example in the drawings and will be described in detail. It should be understood, however, that the intention is no to limit aspects of the invention to the particular embodiments described. On the contrary, the intention is to cover all modifications, equivalents, and alternatives falling within the scope of the claims.

All numeric values are herein assumed to be preceded by the term "about", whether or not explicitly indicated. The term "about" generally refers to a range of numbers that one of skill in the art would consider equivalent to the recited value (i.e. having the same function or result). In many instances, the term "about" may be indicative as including numbers that are rounded to the nearest significant figure.

Any recitation of numerical ranges by endpoints includes all numbers within that range (e.g., 1 to 5 includes a.o. 1, 4/3, 1.5, 2, e, 2.75, 3, π, 3.80, 4, and 5).

Although some suitable dimension ranges and/or values pertaining to various components, features and/or specifications are disclosed, one of skill in the art, incited by the present disclosure, would understand desired dimensions, ranges and/or values may deviate from those expressly disclosed.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

The present disclosure relates to a method and a device for measuring/monitoring severity of vibrations of all possible types, e.g. Aeolian vibrations, buffeting, wind-induced, sub-span, etc., with respect to a suspended span of cable or for an electric power line comprising such a suspended cable span.

The invention may nevertheless have other applications in fields not directly related to electric power transmission.

The method consists in estimating the change of tension, i.e. the dynamic part of tension, in a cable due to change of length of that cable during vibrations. In the ideal case, no vibration induces cable bending and therefore there is no fatigue-related aging.

In case of a multiple-span section, a monitoring device according to the present invention has to be repeated on all critical spans or on spans intended to be specifically monitored along the section.

In a purpose of analysis and explanation, the computation and formulas are simplified by assuming a levelled span with fixed supports having relative small and negligible sag compared to span length—in practice sag is most of the time of about from 2% to 4% of span length, uniform loading, i.e. uniform conductor weight per unit length, ice and wind pressure neglected here, along a suspended cable, bending stiffness effect neglected, and no out-of-plane vibration (during Aeolian vibration, vibrations are perpendicular to wind speed, i.e. are mainly vertical in case of overhead lines), and any other well-known hypotheses being easily obtained from aforementioned references. Further there are no fittings on the conductor, Irvine's parameter effect is negligible, there is no damping, no bending stiffness, no effect of insulations chains, etc.

In that simplified case, the suspended cable can be considered as a vibrating string and the additional dynamic cable tension ΔH can be assumed constant along the cable span (see for example H. Irvine, Cable Structures. MIT Press, Cambridge, 1981). The change of tension ΔH is fundamentally related to change of length Δl through Hooke's law $$\Delta H = ES\frac{\Delta l}{l}$$

where:

ΔH [N] is the dynamic part of the tension;

E [N/m$^2$] is the modulus of elasticity of the conductor;

S [m$^2$] is the section of the conductor;

l [m] the cable length in the static configuration—in the referential (vibration) equilibrium state, i.e. initial state during no vibration. This is a quantity which usually is only a little greater than the span length itself since sag is small compared to span length (typical range of sag is from 2% to 4% of span length). This quantity is given by $$le = l\left[1 + \frac{1}{8}\left(\frac{mgl}{H}\right)^2\right] = l\left[1 + 8\left(\frac{d}{l}\right)^2\right].$$

In this document, the quantity $l_e$ is supposed to be equal to span length l since the computation and formulas are simplified in a purpose of analysis and explanation. Note that the corresponding quantity $l_e$ is assumed to be equal to span length l when sagging effect is neglected $$\left(8\left(\frac{d}{l}\right)^2\right.$$

neglected with respect to unity);

Δl [m] is the change of length due to the difference between the dynamic and static configuration (deformation of initial state due to vibration). The change of length is directly related to mode shape of vibration and eventually static sagging curve.

Figure 2:
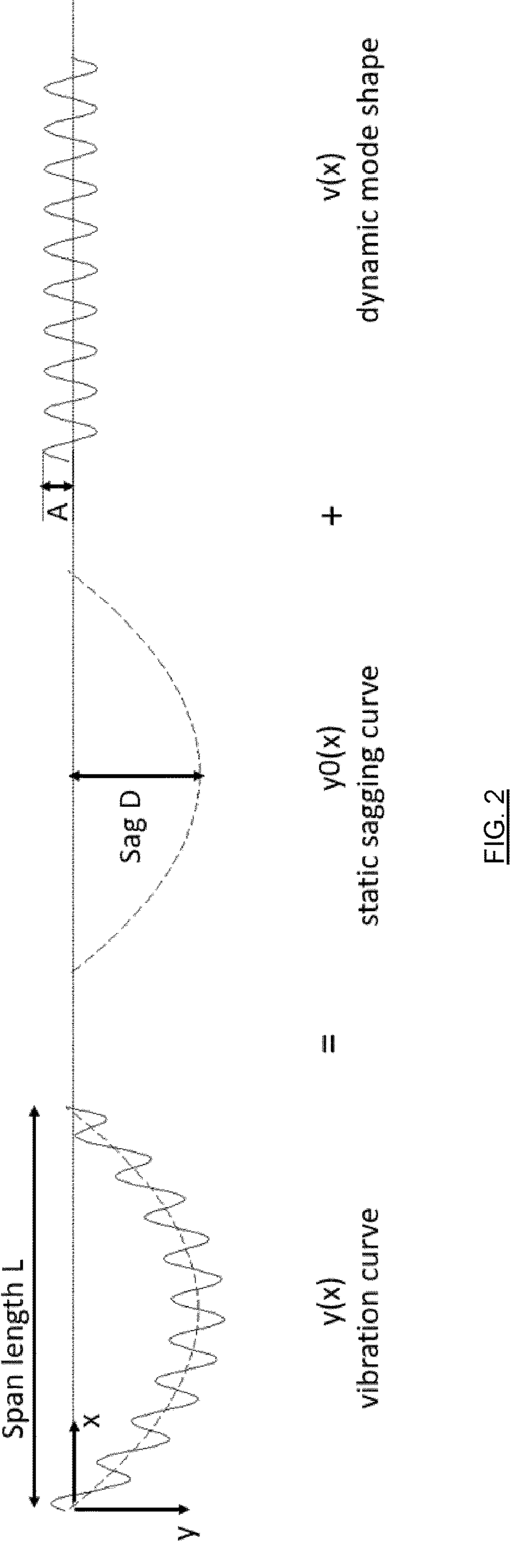
FIG. 2 is representing the vibration curve y of a suspended cable as the combination of the static sagging curve $y_0$ and the dynamic curve related to mode shape of vibration $y_d$.

As shown in FIG. 2, the vibration curve of aforementioned vibrating string is the combination of the static sagging curve $y_0$ and the dynamic curve related to mode shape of vibration $y_d$. In the following, the influence of sag is neglected for a purpose of analysis and explanation. In other words, $y_0$ is set to 0. The sagging curve is easily considered, and complete formulas can be easily derived from and/or found in literature (see for example H. Irvine, Cable Structures. MIT Press, Cambridge, 1981). In that case, change of length is given by the spatial integration of the square of the spatial derivative of the mode shape curve only. Mathematically speaking, this is written as follows:

$$\Delta l = l_{y_0+y_d} - l_{y_0} = \frac{1}{2}\int_0^l \left(\frac{dv}{dx}\right)^2 dx$$

Following previous assumptions made for purpose of analysis and explanation, it is also well-known from literature (see for example H. Irvine, Cable Structures. MIT Press, Cambridge, 1981) that the mode shape is given by the vibrating string theory and has the form $$y_d(x) = A\sin\left(\frac{\omega}{c}x\right) = A\sin\left(\frac{k\pi}{l}x\right), \text{ where } c = \sqrt{\frac{H}{m}}$$

is velocity of propagation of a wave along the string [m/s], ω=2πf is the pulsation of vibration [Hz], A is the zero-to-peak, referred to as 0-pk, antinode amplitude of vibration (half of peak-to-peak, referred to as pk-pk, amplitude) [m] and k=1, 2, . . . is the index of the mode. The change of length is therefore directly related to the square of the severity of vibration. Severity of vibration is defined as the product of vibration frequency by antinode amplitude of vibration. One has, using previous defined symbols and nomenclature, $$\Delta H = ES\frac{\Delta l}{l} = \frac{ES}{l}\frac{1}{2}\int_0^l \left(\frac{dy_d}{dx}\right)^2 dx = \frac{ES}{4}\left(\frac{A\omega}{c}\right)^2 = \pi^2\frac{ES}{c^2}(Af)^2 = \pi^2\frac{ESm}{H}(Af)^2$$

It is noted here that there is no dynamic ΔH part of tension if there is no vibration (A=0). It is also noted here that dynamic tension takes into account any mode shape as presented as integral function. In the above, the influence of any fitting as dampers, warning sphere, etc. installed along aforementioned suspended cable, influence of bending stiffness of suspended cable, any particular boundary conditions as movements of attachment ends, and any other parameter influencing mode shape are neglected for a purpose of analysis and explanation. In other words, vibrating mode is supposed to be a pure sine wave. This should not be seen as a limitation of the previously detailed method, but it is rather used to help the reader to get an understanding of the concern and/or analysis of relationship between multiple variables related to vibration and fatigue of a suspended cable.

The severity of vibration, i.e. the product frequency of vibration times antinode amplitude of vibration, is consequently easily obtained from tension readings (static H and dynamic ΔH components) as follows:

$$\frac{1}{\pi}\sqrt{\frac{\Delta HH}{ESm}} = Af$$

As previously presented, the product frequency times antinode amplitude is a of prime interest in estimating the stress level (see the previous section defining idealized alternating stress and corresponding fatigue indicators, in terms of the antinode amplitude). This means that the stress level can be obtained from above-mentioned product frequency of vibration times antinode amplitude of vibration through tension measurement. Combining above equations ($A=Y_{max}$), this gives $$\sigma_a = \pi dE_a\sqrt{\frac{m}{EI}}fA = \pi dE_a\sqrt{\frac{m}{EI}}\frac{1}{\pi}\sqrt{\frac{\Delta HH}{ESm}} = dE_a\sqrt{\frac{\Delta H}{EI}\frac{H}{ES}}$$

It is noted here that it is natural to relate H to ES and ΔH to EI as mean level is related to mean tension divided by ES and dynamic tension is related to vibration and bending fatigue of suspended cable.

As previously detailed, classical fatigue analysis is based on Miner's rule and cumulative damage theory. This means that the damage fraction at a given stress level is equal to the cycle ratio, defined as the ratio of the number of cycles at given stress level, $n_i$, to the fatigue life cycle, i.e. maximum number of cycles before failure and/or number of cycles that reaches endurance limit (a given number of strand failures for example) at that stress level, $N_i$. The term cycle refers to repeated applications of stress that lead to eventual fatigue and failure and frequency is defined as the number of cycles per seconds of a time-dependent function (frequency is the number of cycles in a unit of time, i.e. one second). The frequency reading is obtained from frequency analysis by Fourier Transform for example and/or any time-frequency analysis of measurements. A frequency-analysis of dynamic tension/tension readings gives access to the number of cycles that appears in tension spectrum and related to vibration mode shape.

However, as highlighted above, severity of vibration (or product of frequency by antinode amplitude) can be advantageously and directly obtained from tension measurement. This could be enough to distinguish any damping system on similar conductor in similar conditions. For that there is no need to estimate stress level and distribution of dynamic tension values/measurements is enough to rank aforementioned systems. That being said, a different approach in fatigue-related concern of overhead lines could be obtained by making a link with dynamic tension measurements. Instead of looking at observed stress-cycle curve, dynamic tension distribution can be useful.

Consequently, the number of cycles can be obtained thanks to frequency analysis. As previously detailed, a pure single mode shape, i.e. vibration at single frequency (and pure sine due to above assumptions) has severity of vibration (or product of frequency by amplitude) directly related to dynamic tension readings. In such a case of pure single vibration mode, frequency analysis makes appear one peak in the frequency domain, i.e. related to the single frequency of vibration. This frequency analysis of tension measurement readings allows estimating the number of cycles by multiplying the detected single frequency peak (this gives the frequency, i.e. the number of cycles per second) with the period of analysis in seconds. This can be improved by use of any time-frequency analysis, mostly in case of non-continuous single vibration during period of analysis since this decomposes the period of analysis in smaller period blocks.

Figure 3:
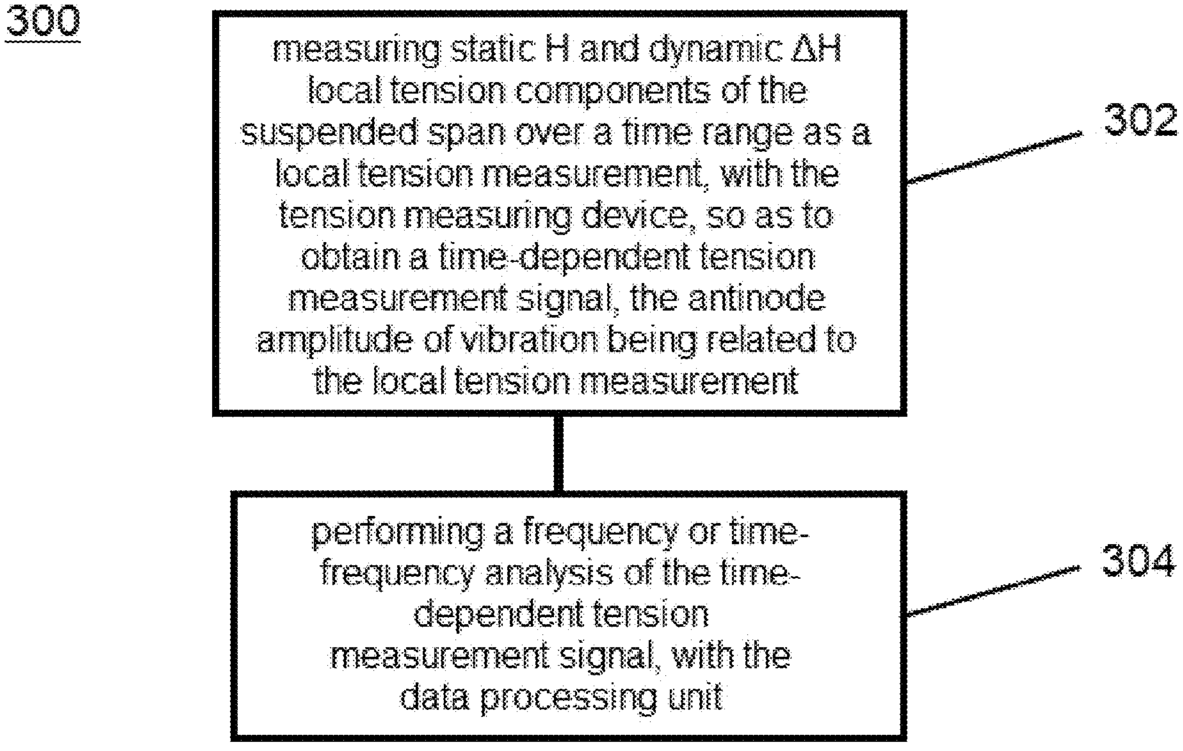
FIG. 3 is representing a method for estimating a severity of vibration, the method including steps of: a. measuring static H and dynamic ΔH local tension components of the suspended span over a time range as a local tension measurement, with the tension measuring device, so as to obtain a time-dependent tension measurement signal, the antinode amplitude of vibration being related to the local tension measurement; and b. performing a frequency or time-frequency analysis of the time-dependent tension measurement signal, with the data processing unit.

FIG. 3 shows a method 300 for estimating a severity of vibration, the method 300 including steps of: measuring 302 static H and dynamic ΔH local tension components of the suspended span over a time range as a local tension measurement, with the tension measuring device, so as to obtain a time-dependent tension measurement signal, the antinode amplitude of vibration being related to the local tension measurement; and performing 304 a frequency or time-frequency analysis of the time-dependent tension measurement signal, with the data processing unit. An estimation of the severity of vibration is obtained from the local tension components of the formula:

$$\frac{1}{\pi}\sqrt{\frac{\Delta HH}{ESm}} = Af$$

The variables m, E, and S are, respectively, a mass per unit length, a modulus of elasticity, and a section of the suspended electrical cable span. The fatigue lifetime or damage are obtained from a number of cycles estimated from the frequency or time-frequency analysis and a stress level is obtained from the tension.

Figure 4:
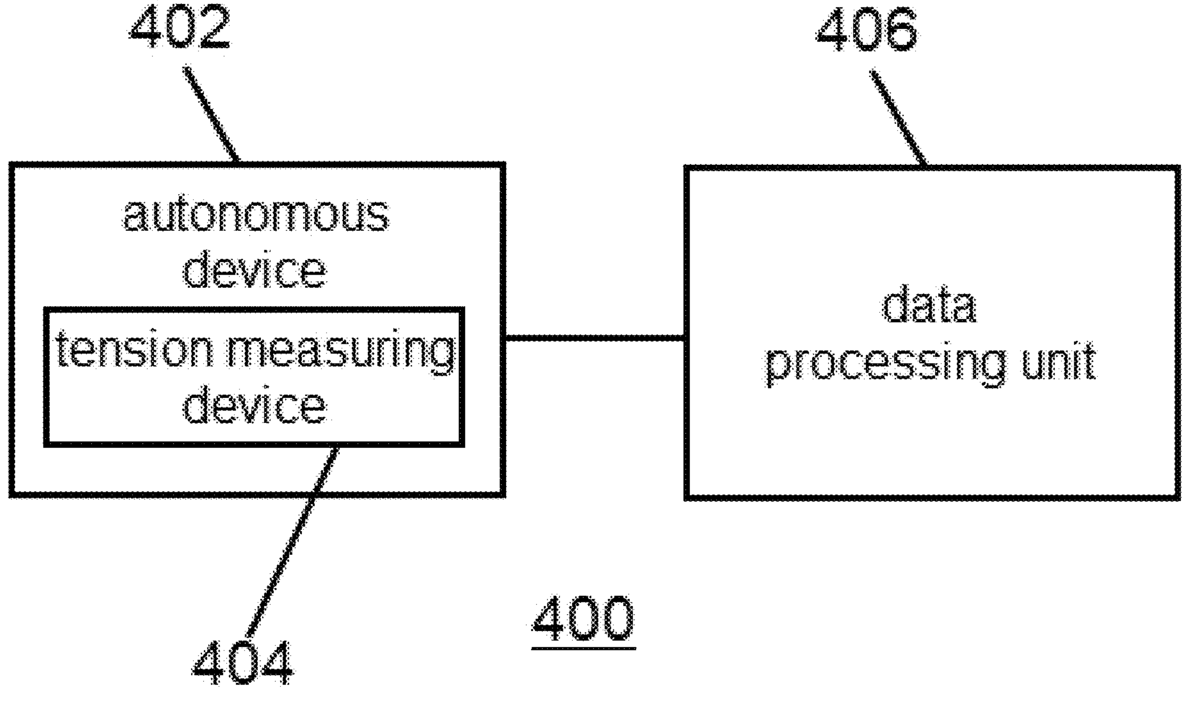
FIG. 4 is representing a system for estimating a severity of vibration, which is a product of vibration frequency f by antinode amplitude of vibration A, and for estimating fatigue lifetime or damage of a suspended electrical cable span of overhead power lines, the system including: an autonomous device fixed on the suspended cable span, and comprising a tension measuring device mounted thereon; and an on-board data processing unit or a data processing unit remotely connected to the autonomous device.

FIG. 4 is representing a system 400 for estimating a severity of vibration, which is a product of vibration frequency f by antinode amplitude of vibration A, and for estimating fatigue lifetime or damage of a suspended electrical cable span of overhead power lines, the system 400 including: an autonomous device 402 fixed on the suspended cable span, and comprising a tension measuring device 404 mounted thereon; and an on-board data processing unit or a data processing unit 406 remotely connected to the autonomous device 402. The system 400 is configured to: measure static H and dynamic ΔH local tension components of the suspended span over a time range as a local tension measurement, with the tension measuring device 404, so as to obtain a time-dependent tension measurement signal, the antinode amplitude of vibration being related to the local tension measurement, and performing a frequency or time-frequency analysis of the time-dependent tension measurement signal, with the data processing unit 406. The severity of vibration is obtained from the local tension components of the formula:

$$\frac{1}{\pi}\sqrt{\frac{\Delta HH}{ESm}} = Af$$

The variables m, E, and S are, respectively, a mass per unit length, a modulus of elasticity, and a section of the suspended electrical cable span. Estimation of fatigue lifetime or damage is obtained from a number of cycles estimated from the frequency or time-frequency analysis and a stress level is obtained from the tension.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for estimating a severity of vibration, which is a product of vibration frequency f by antinode amplitude of vibration A, and for estimating fatigue lifetime or damage of a suspended electrical cable span of overhead power lines, the suspended electrical cable span having a sag possibly negligible with respect to span length and a local tension, and being subject to a variation of the local tension over time, and to subsequent change of length, due to vibration, the method using an autonomous device with a tension measuring device mounted thereon and fixed to the suspended cable span and an on-board or remotely connected data processing unit, the method comprising steps of:

a. measuring static H and dynamic ΔH local tension components of the suspended span over a time range as a local tension measurement, with the tension measuring device, so as to obtain a time-dependent tension measurement signal, the antinode amplitude of vibration being related to the local tension measurement; and b. performing a frequency or time-frequency analysis of the time-dependent tension measurement signal, with the on-board or remotely connected data processing unit, wherein an estimation of the severity of vibration is obtained from the local tension components of the formula:

$$\frac{1}{\pi}\sqrt{\frac{\Delta H\, H}{ES\, m}} = Af$$

wherein m, E, and S are, respectively, a mass per unit length, a modulus of elasticity, and a section of the suspended electrical cable span, and wherein the fatigue lifetime or damage are obtained from a number of cycles estimated from the frequency or time-frequency analysis and a stress level is obtained from the tension.

2. The monitoring device of claim 1, wherein the tension measuring device operates within a passband extending between 0 Hz and 300 Hz.

3. The method of claim 1, wherein the fatigue lifetime or damage is estimated during an event or an extreme event, inducing change of cable span length, and comprising galloping, creeping, ice-shedding, storms, and maintenance work.

4. One or more non-transitory computer-readable mediums having processor-executable instructions stored thereon, wherein the processor-executable instructions, when executed by a computer processor, facilitate the method of claim 1, when the computer processor is on-board in the autonomous device or remotely connected to the autonomous device comprising the tension measuring device for measuring the local tension of the suspended span over a time range.

5. A system for estimating a severity of vibration, which is a product of vibration frequency f by antinode amplitude of vibration A, and for estimating fatigue lifetime or damage of a suspended electrical cable span of overhead power lines, the system comprising:

an autonomous device fixed on the suspended cable span, and comprising a tension measuring device mounted thereon; and an on-board data processing unit or a data processing unit remotely connected to the autonomous device, wherein the system is configured to:

measure static H and dynamic ΔH local tension components of the suspended span over a time range as a local tension measurement, with the tension measuring device, so as to obtain a time-dependent tension measurement signal, the antinode amplitude of vibration being related to the local tension measurement, and perform a frequency or time-frequency analysis of the time-dependent tension measurement signal, with the on-board or remotely connected data processing unit, wherein the severity of vibration is obtained from the local tension components of the formula:

$$\frac{1}{\pi}\sqrt{\frac{\Delta H\, H}{ES\, m}} = Af$$

wherein m, E, and S are, respectively, a mass per unit length, a modulus of elasticity, and a section of the suspended electrical cable span, and wherein estimation of fatigue lifetime or damage is obtained from a number of cycles estimated from the frequency or time-frequency analysis and a stress level is obtained from the tension.

6. The system of claim 5, wherein the tension measuring device is configured to impose a deflection to a cable portion of the overhead power lines traversing the autonomous device, providing resulting output strain gauge measurements.

* * * * *